(12) United States Patent
Choi et al.

(10) Patent No.: US 10,789,687 B2
(45) Date of Patent: Sep. 29, 2020

(54) IMAGE PROCESSING METHOD AND IMAGE PROCESSOR PERFORMING THE SAME

(71) Applicant: Samsung Display Co., Ltd., Yongin-si, Gyeonggi-do (KR)

(72) Inventors: Nam-Gon Choi, Yongin-si (KR); Namjae Lim, Gwacheon-si (KR); Moonshik Kang, Hwaseong-si (KR); Jinpil Kim, Suwon-si (KR); JaeSung Bae, Suwon-si (KR); Jaehoon Lee, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 142 days.

(21) Appl. No.: 16/190,463

(22) Filed: Nov. 14, 2018

(65) Prior Publication Data

US 2019/0156469 A1 May 23, 2019

(30) Foreign Application Priority Data

Nov. 21, 2017 (KR) .......................... 10-2017-0155735

(51) Int. Cl.
*G06T 5/00* (2006.01)
*G06T 3/40* (2006.01)

(52) U.S. Cl.
CPC .............. *G06T 5/009* (2013.01); *G06T 3/403* (2013.01)

(58) Field of Classification Search
None
See application file for complete search history.

(56) References Cited

U.S. PATENT DOCUMENTS

| 2013/0293596 | A1  | 11/2013 | Atkins  |            |
|--------------|-----|---------|---------|------------|
| 2017/0256039 | A1* | 9/2017  | Hsu     | G09G 5/02  |
| 2017/0358064 | A1* | 12/2017 | Hendry  | G06T 7/11  |
| 2018/0108327 | A1* | 4/2018  | Jung    | G09G 5/10  |
| 2018/0233075 | A1* | 8/2018  | Boyd    | H04N 9/67  |

FOREIGN PATENT DOCUMENTS

| KR | 101520069 B1    | 5/2015 |
| KR | 1020170087078 A | 7/2017 |
| KR | 1020170088461 A | 8/2017 |

* cited by examiner

*Primary Examiner* — Vikkram Bali
(74) *Attorney, Agent, or Firm* — Cantor Colburn LLP

(57) ABSTRACT

In an image processing method that converts image data into output data by performing tone mapping, an edge of an image represented by the image data is determined, a first tone mapping operation is performed on first image data included in the image data, where the first image data represent a first portion of the image not including the edge, whether a gray level of second image data is within a predetermined gray range is determined, where the second image data represent a second portion of the image including the edge, a second tone mapping operation is performed on the second image data when the gray level of the second image data is within the gray range, and the first tone mapping operation is performed on the second image data when the gray level of the second image data is not within the gray range.

18 Claims, 12 Drawing Sheets

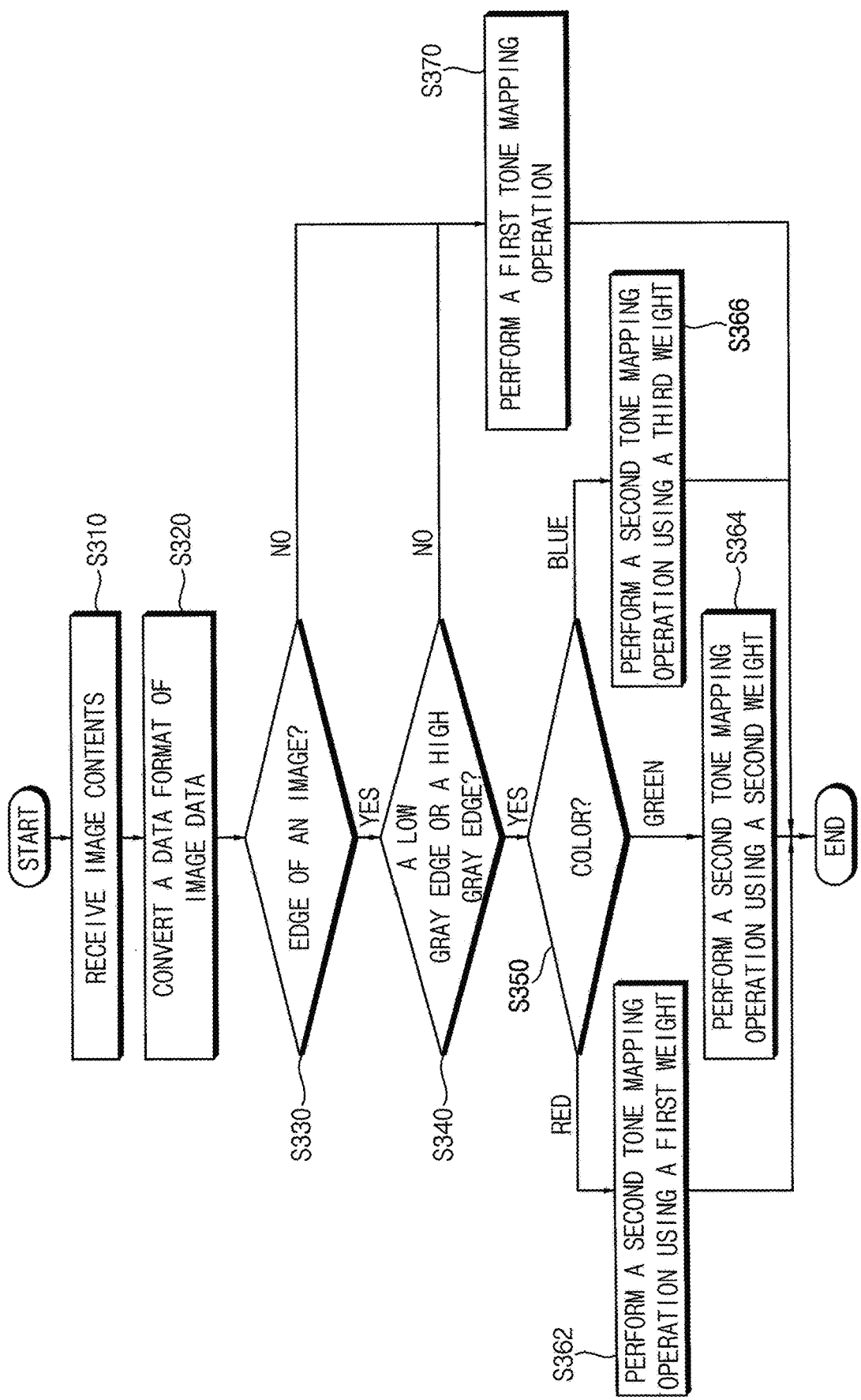

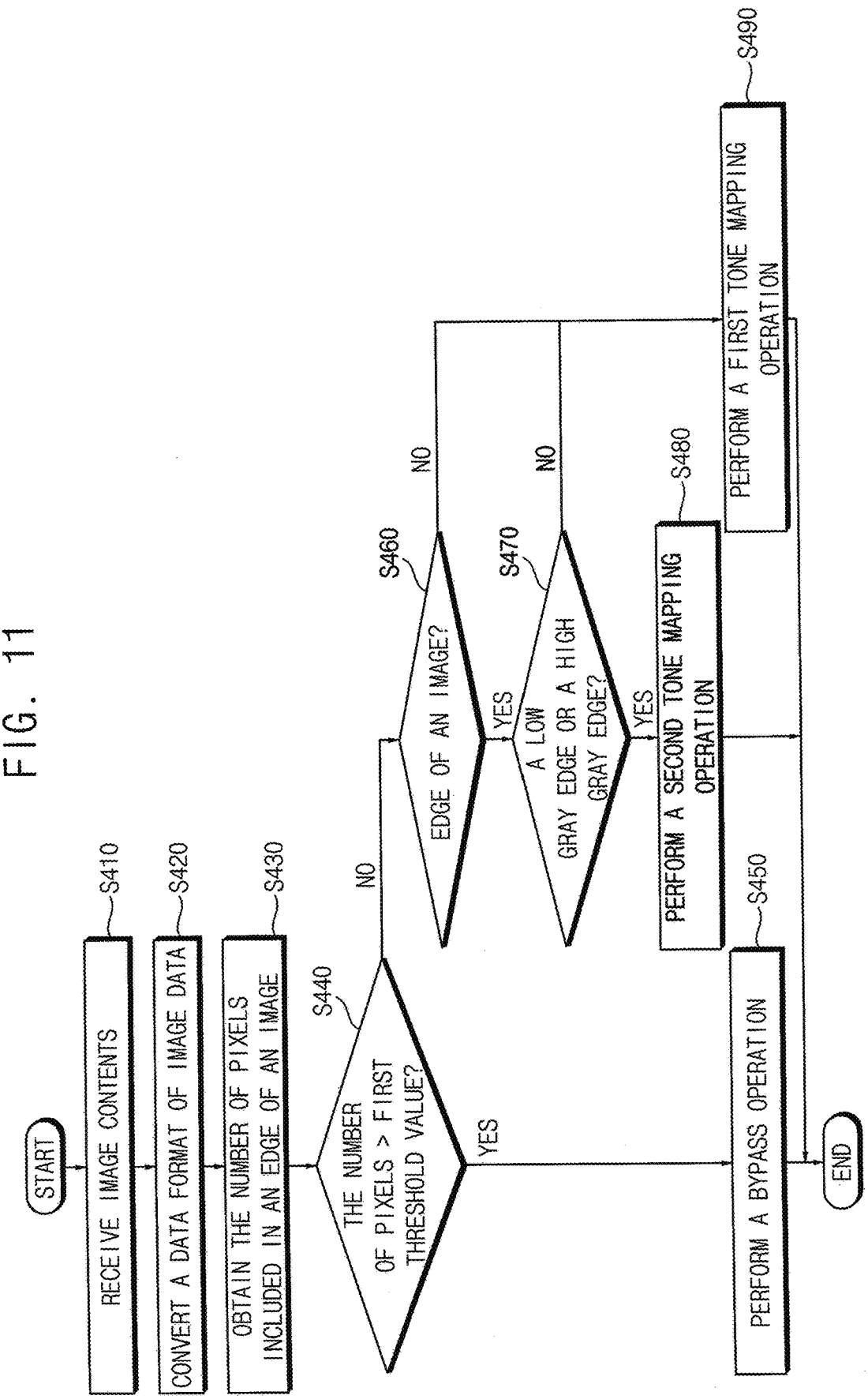

IMAGE PROCESSING METHOD AND IMAGE PROCESSOR PERFORMING THE SAME

This application claims priority to Korean Patent Application No. 10-2017-0155735, filed on Nov. 21, 2017 and all the benefits accruing therefrom under 35 U.S.C. § 119, the content of which in its entirety is herein incorporated by reference.

BACKGROUND

1. Field

Exemplary embodiments of the invention relate to image processing processors, and more particularly to image processing methods capable of improving accuracy at edge portions and image processors performing the image processing methods.

2. Description of the Related Art

Generally, when a dynamic range of a display device is different from a dynamic range of original image data, the original image data may be converted corresponding to the dynamic range of the display device. Further, various display devices having different dynamic ranges may display an image corresponding to the original image data by converting the original image data corresponding to the dynamic ranges of the various display devices. This operation that converts the dynamic range of the original image data to match the dynamic range of the display device may be referred to as tone mapping.

SUMMARY

By a tone mapping, image quality at a low gray region and a high gray region may be lowered, and an edge of an image may not be accurately displayed.

Some exemplary embodiments provide an image processing method capable of improving accuracy of an edge portion.

Some exemplary embodiments provide an image processor performing the image processing method.

According to exemplary embodiments, there is provided an image processing method that converts image data into output data by performing tone mapping. In the image processing method, an edge of an image represented by the image data is determined, a first tone mapping operation is performed on first image data included in the image data, where the first image data represent a first portion of the image not including the edge, whether a gray level of second image data is within a predetermined gray range is determined, where the second image data represent a second portion of the image including the edge, a second tone mapping operation is performed on the second image data when the gray level of the second image data is within the predetermined gray range, and the first tone mapping operation is performed on the second image data when the gray level of the second image data is not within the predetermined gray range.

In an exemplary embodiment, the first tone mapping operation may convert the image data into the output data using a first conversion function, and the second tone mapping operation may convert the image data into the output data using a second conversion function different from the first conversion function.

In an exemplary embodiment, the predetermined gray range may include at least one of a first gray range less than a first threshold gray level and a second gray range greater than a second threshold gray level, and the second threshold gray level may be greater than the first threshold gray level.

In an exemplary embodiment, in the first gray range, the output data generated by the first tone mapping operation may be less than or equal to the output data generated by the second tone mapping operation.

In an exemplary embodiment, in the second gray range, the output data generated by the first tone mapping operation may be greater than or equal to the output data generated by the second tone mapping operation.

In an exemplary embodiment, at least one of the first gray range and the second gray range may be adjusted based on an average gray level of the image data.

In an exemplary embodiment, a first absolute difference between the image data and the output data generated by the first tone mapping operation may be greater than or equal to a second absolute difference between the image data and the output data generated by the second tone mapping operation.

In an exemplary embodiment, to determine the edge of the image, a data format of the image data may be converted from an RGB format to a conversion image format where luminance data and chrominance data are separated, and the edge may be determined by applying a high-pass filter to the luminance data.

In an exemplary embodiment, a number of pixels included in the edge may be obtained, and a bypass operation may be performed on an entirety of the image data when the number of pixels is greater than a first threshold value.

In an exemplary embodiment, the output data generated by the bypass operation may increase in linear proportion to an increase of a gray level of the image data.

In an exemplary embodiment, the second tone mapping operation may convert the image data corresponding to a first color into the output data by a second conversion function to which a first weight is applied, and may convert the image data corresponding to a second color different from the first color into the output data by the second conversion function to which a second weight different from the first weight is applied.

According to exemplary embodiments, there is provided an image processing method that converts image data into output data by performing tone mapping. In the image processing method, a number of pixels included in an edge of an image represented by the image data is obtained, a bypass operation is performed on the image data when the number of pixels is greater than a first threshold value, and a first tone mapping operation is performed on the image data when the number of pixels is less than or equal to the first threshold value.

In an exemplary embodiment, the output data generated by the bypass operation may increase in linear proportion to an increase of a gray level of the image data.

According to example embodiments, there is provided an image processor that converts image data into output data by performing tone mapping. The image processor includes a signal receiver receiving image contents including the image data and meta data for the image data, a tone mapper determining an edge of an image represented by the image data, performing a first tone mapping operation on first image data included in the image data, where the first image data represent a first portion of the image not including the edge, determining whether a gray level of second image data is within a predetermined gray range, where the second image data represent a second portion of the image including the edge, performing a second tone mapping operation on the second image data when the gray level of the second image data is within the predetermined gray range, and performing the first tone mapping operation on the second image data when the gray level of the second image data is not within the predetermined gray range, and an image controller performing a post-processing operation on the image based on the output data and the meta data.

In an exemplary embodiment, the first tone mapping operation may convert the image data into the output data using a first conversion function, and the second tone mapping operation may convert the image data into the output data using a second conversion function different from the first conversion function.

In an exemplary embodiment, the predetermined gray range may include at least one of a first gray range less than a first threshold gray level and a second gray range greater than a second threshold gray level, and the second threshold gray level may be greater than the first threshold gray level.

In an exemplary embodiment, in the first gray range, the output data generated by the first tone mapping operation may be less than or equal to the output data generated by the second tone mapping operation.

In an exemplary embodiment, in the second gray range, the output data generated by the first tone mapping operation may be greater than or equal to the output data generated by the second tone mapping operation.

In an exemplary embodiment, the tone mapper may obtain a number of pixels included in the edge, and perform a bypass operation on an entirety of the image data when the number of pixels is greater than a first threshold value.

In an exemplary embodiment, the second tone mapping operation may convert the image data corresponding to a first color into the output data by a second conversion function to which a first weight is applied, and may convert the image data corresponding to a second color different from the first color into the output data by the second conversion function to which a second weight different from the first weight is applied.

As described above, the image processing method according to exemplary embodiments may detect an edge of an image. The image processing method may apply relaxed tone mapping (or perform the second tone mapping operation) to a high gray edge or a low gray edge, or may apply linear tone mapping (or a bypass operation) when the number of pixels included in an edge of an image is greater than a threshold value. Accordingly, the image processing method may prevent a detail loss of an edge in low and high gray regions, and may prevent image distortion caused by high dynamic range ("HDR") image processing.

Further, the image processor according to exemplary embodiments may perform appropriate tone mapping operations according to characteristics or conditions (e.g., a gray range, a color, etc. of an edge) of image data, thereby preventing the detail loss of the edge and the image distortion caused by the HDR image processing.

BRIEF DESCRIPTION OF THE DRAWINGS

Illustrative, non-limiting exemplary embodiments will be more clearly understood from the following detailed description in conjunction with the accompanying drawings.

FIG. 9 is a flowchart illustrating an exemplary embodiment of an image processing method.

FIG. 11 is a flowchart illustrating an exemplary embodiment of an image processing method.

DETAILED DESCRIPTION

Figure 1:
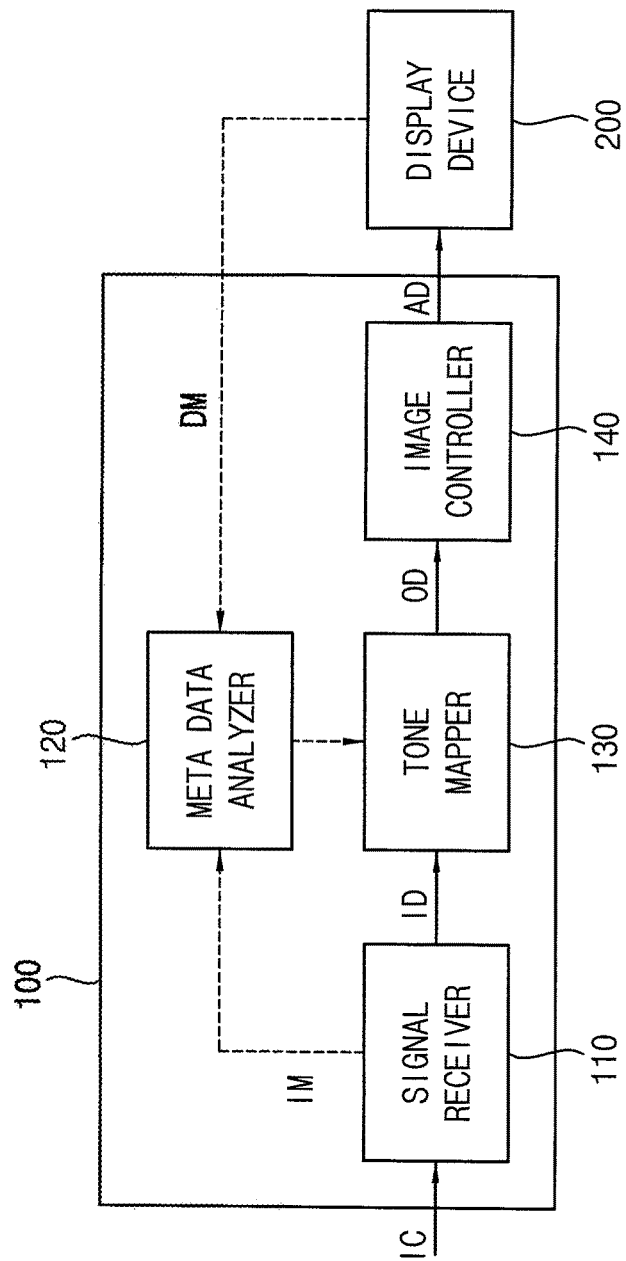
FIG. 1 is a block diagram illustrating an exemplary embodiment of an image processor.

Hereinafter, embodiments of the invention will be explained in detail with reference to the accompanying drawings. This invention may, however, be embodied in many different forms, and should not be construed as limited to the embodiments set forth herein. Rather, these embodiments are provided so that this invention will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

FIG. 1 is a block diagram illustrating an image processor according to exemplary embodiments.

Referring to FIG. 1, an image processor 100 may include a signal receiver 110, a meta data analyzer 120, a tone mapper 130 and an image controller 140.

The signal receiver 110 may receive image contents IC including image data ID and meta data IM for the image data ID. The signal receiver 110 may distinguish between the image data ID and the meta data IM by analyzing the image contents IC, may transfer the image data ID to the tone mapper 130, and may transfer the meta data IM to the meta data analyzer 120.

The meta data analyzer 120 may receive the meta data IM included in the image contents IC from the signal receiver 110. In an exemplary embodiment, the meta data IM of the image contents IC may include maximum luminance information or the like of the image data ID for tone mapping, for example. The meta data analyzer 120 may further receive meta data DM of a display device 200 from the display device 200. In an exemplary embodiment, the meta data DM of the display device 200 may include maximum luminance information or the like of the display device 200 for the tone mapping, for example. The meta data analyzer 120 may provide the tone mapper 130 with the meta data IM of the image contents IC and/or the meta data DM of the display device 200.

The tone mapper 130 may convert the image data ID into output data OD based on the meta data IM and DM received from the meta data analyzer 120 such that a dynamic range of the image data ID (or the image contents IC) is changed corresponding to a dynamic range of the display device 200.

In an exemplary embodiment, the tone mapper 130 may determine an edge of an image represented by the image data ID, for example. In some exemplary embodiments, the tone mapper 130 may convert a data format of the image data ID from an RGB format to a conversion image format (e.g., an YCbCr format) where luminance data and chrominance data are separated, and may determine the edge by applying a high-pass filter to the luminance data.

With respect to first image data representing a first portion of the image not including the edge, the tone mapper 130 may perform a first tone mapping operation (or a normal tone mapping operation) on the first image data included in the image data. Further, with respect to second image data representing a second portion of the image including the edge, the tone mapper 130 may determine whether a gray level of the second image data included in the image data is within a predetermined gray range, may perform a second tone mapping operation (or a relaxed tone mapping operation) on the second image data when the gray level of the second image data is within the gray range (e.g., in case of a high gray edge or a low gray edge), and may perform the first tone mapping operation on the second image data when the gray level of the second image data is not within the gray range. Here, the second tone mapping operation may relatively close to linear mapping compared with the first tone mapping operation. Thus, compared with an image generated by the first tone mapping operation, an image generated by the second tone mapping operation may have relatively low contrast, but may have relatively high detail.

In some exemplary embodiments, the tone mapper 130 may obtain the number of pixels included in the edge based on the image data ID, and may perform a bypass operation on the entire image data ID when the number of pixels is greater than a first threshold value. Here, the bypass operation may linearly map the image data ID to the output data OD. That is, the output data OD generated by the bypass operation may increase in linear proportion to an increase of a gray level of the image data ID. As described above, the tone mapper 130 may perform appropriate tone mapping operations according to characteristics or conditions (e.g., a gray range of the edge, the number of pixels of the edge, etc.) of image data.

The image controller 140 may perform a post-processing operation based on the output data OD and the meta data IM and DM. In an exemplary embodiment, the image controller 140 may control respective luminances of a plurality of regions that are divided according to luminance based on the meta data IM and DM, for example. Further, the image controller 140 may perform, as the post-processing operation, various image processing techniques, such as contrast enhancement that maximize a difference between a bright portion and a dark portion of an image, histogram equalization that adjusts image intensities to enhance contrast, image sharpening that increases an apparent sharpness of an image, image smoothing that removes noise in an image, etc. The image controller 140 may provide the post-processed output data AD to the display device 200 to display an image processed by the image processor 100.

As described above, the image processor 100 may apply the second tone mapping operation (or the relaxed tone mapping operation) on the high gray edge or the low gray edge, or may apply the bypass operation when the number of pixels included in the edge is greater than the threshold value. Accordingly, the image processor 100 may improve an accuracy of high dynamic range ("HDR") image processing while providing detailed representation of the edge.

Although FIG. 1 illustrates an example of the image processor 100 including the signal receiver 110, the meta data analyzer 120, the tone mapper 130 and the image controller 140, the invention is not limited thereto, and the image processor 100 according to other exemplary embodiments may have various configurations that perform the tone mapping operations.

Further, although FIG. 1 illustrates an example where the image processor 100 is located outside the display device 200, the invention is not limited thereto, and the image processor 100 may be located at various positions in other exemplary embodiments. In an exemplary embodiment, the image processor 100 may be located inside the display device 200 (e.g., inside a timing controller of the display device 200), for example.

Figure 2:
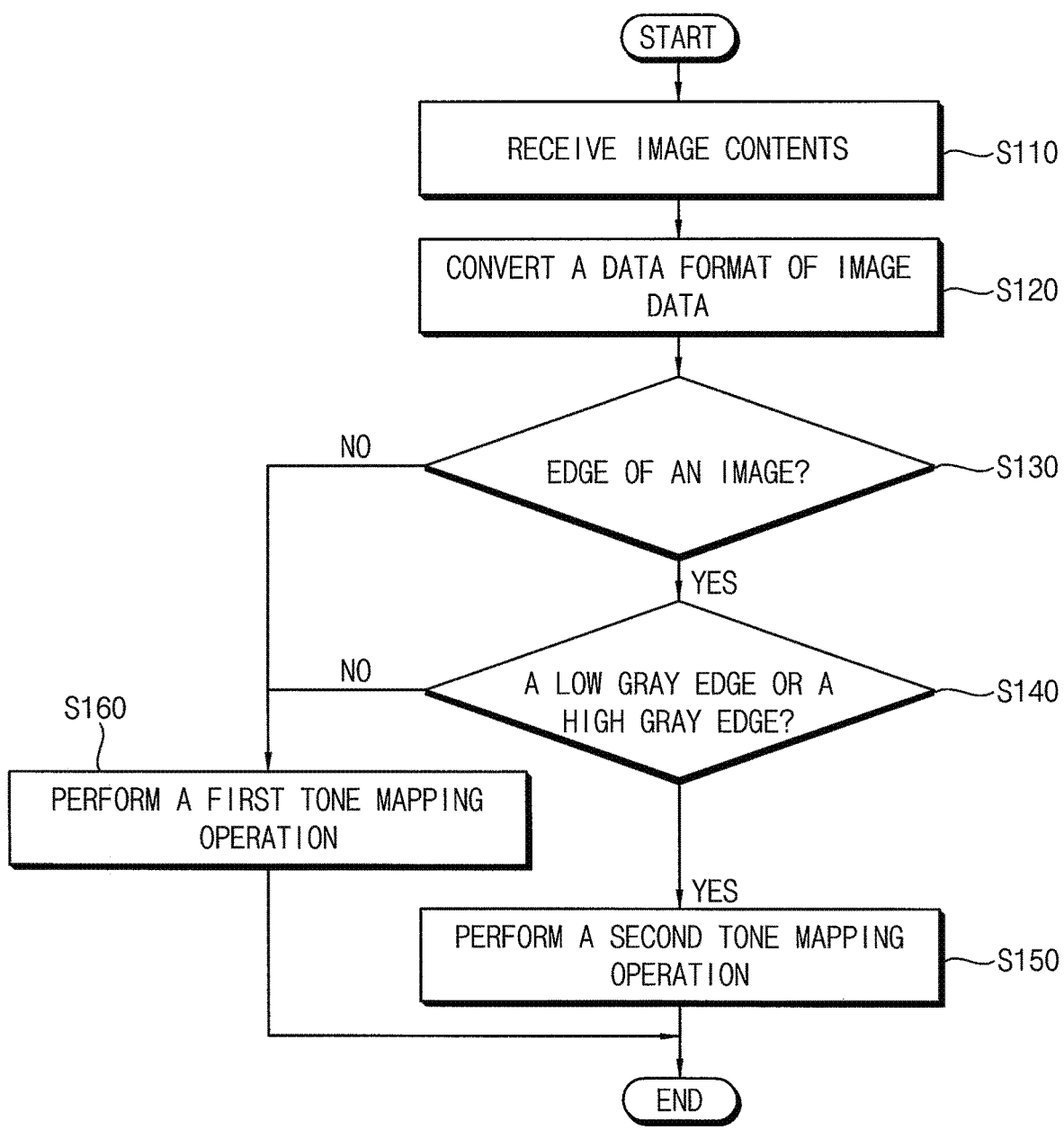
FIG. 2 is a flowchart illustrating an exemplary embodiment of an image processing method.
Figure 3A:
FIGS. 3A through 3C are diagrams for describing an operation that determines a low gray edge or a high gray edge in an image processing method of FIG. 2.
Figure 3B:
Figure 3C:

FIG. 2 is a flowchart illustrating an image processing method according to exemplary embodiments, and FIGS. 3A through 3C are diagrams for describing an operation that determines a low gray edge or a high gray edge in an image processing method of FIG. 2.

Referring to FIGS. 2, 3A, 3B and 3C, an image processing method may detect an edge of an image, and may apply relaxed tone mapping (or perform a second tone mapping operation) to a high gray edge and/or a low gray edge among the detected edge, thereby preventing a detail loss of an edge portion in a high gray region and/or a low gray region.

An image processor may receive image contents including image data and meta data for the image data (S110). To detect an edge of an image represented by the image data, a data format of the image data may be converted from an RGB format into a conversion image format where luminance data and chrominance data are separated (S120). In an exemplary embodiment, the conversion image format may be an YCoCg format or an YCbCr format, for example.

The edge of the image represented by the image data may be determined based on the luminance data (S130). In an exemplary embodiment, the edge of the image may be determined by applying a high-pass filter to the luminance data, for example. In some exemplary embodiments, as illustrated in FIGS. 3A and 3B, the edge of a first image I1 represented by the image data may be determined based on the luminance data, and a second image I2 may be an image including only the edge detected based on the luminance data.

With respect to first image data representing a first portion of the image I1 not including the edge of the image (S130: NO), a first tone mapping operation may be performed on the first image data included in the image data (S160). In an exemplary embodiment, since the first portion not including the edge may not require high detail, the first tone mapping operation may be performed to enhance contrast, for example.

With respect to second image data representing a second portion of the image I1 including the edge of the image (S130: YES), it may be determined whether a gray level of the second image data included in the image data is within a predetermined gray range (S140). In some exemplary embodiments, the gray range may include at least one of a first gray range (e.g., a low gray range) less than a first threshold gray level (e.g., 64-gray level) and a second gray range (e.g., a high gray range) greater than a second threshold gray level (e.g., 220-gray level), and the second threshold gray level may be greater than the first threshold gray level, for example. In an exemplary embodiment, the gray range may include the first gray range (i.e., the low gray range) ranging from 0-gray level to 64-gray level and the second gray range (i.e., the high gray range) ranging from 220-gray level to 255-gray level, for example. In some exemplary embodiments, at least one of the first gray range and the second gray range may be adjusted based on an average gray level of the image data. In an exemplary embodiment, in a case where the average gray level of the image data is relatively low, the first threshold gray level and/or the second threshold gray level may be lowered, for example.

As illustrated in FIG. 3B and 3C, a third image I3 may be an image including only a high gray edge that is an edge within the high gray range among the edge of the second image I2 and a low gray edge that is an edge within the low gray range among the edge of the second image I2.

If the gray level of the second image data is within the gray range (S140: YES), a second tone mapping operation may be performed on the second image data (S150). In an exemplary embodiment, when the gray level of the second image data is within the low gray range (e.g., from 0-gray level to 64-gray level) or within the high gray range (from 220-gray level to 255-gray level), the second tone mapping operation may be performed to provide the high detail of the low gray edge and the high gray edge, for example.

Alternatively, when the gray level of the second image data is not within the gray range (S140: NO), the first tone mapping operation may be performed on the second image data (S160). In an exemplary embodiment, when the second data are not within the low gray range or the high gray range, for example, the high detail may not be desired, and thus the first tone mapping operation may be performed to enhance the contrast.

Figure 4A:
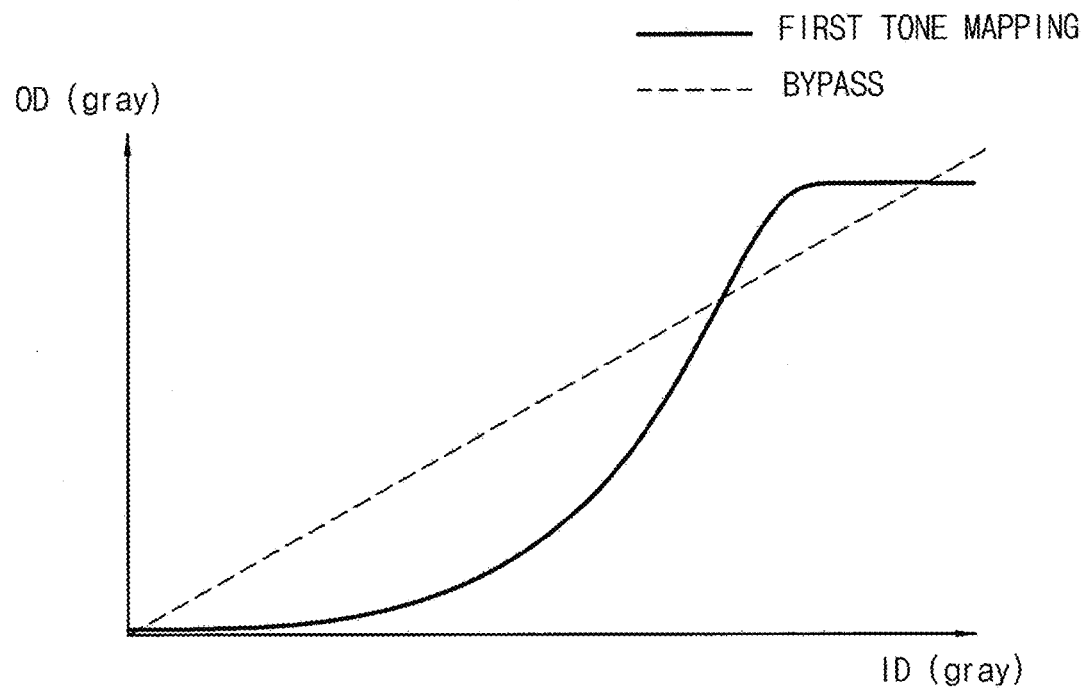
FIG. 4A is a graph for describing a first tone mapping operation in an image processing method of FIG. 2.
Figure 4B:
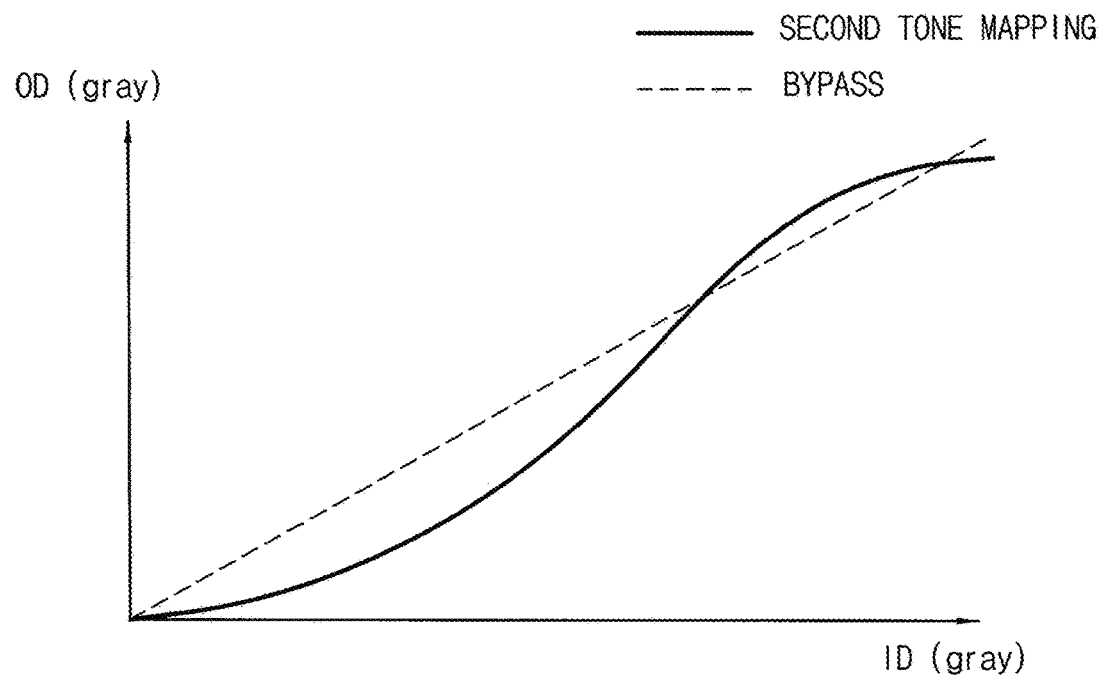
FIG. 4B is a graph for describing a second tone mapping operation in an image processing method of FIG. 2.
Figure 5A:
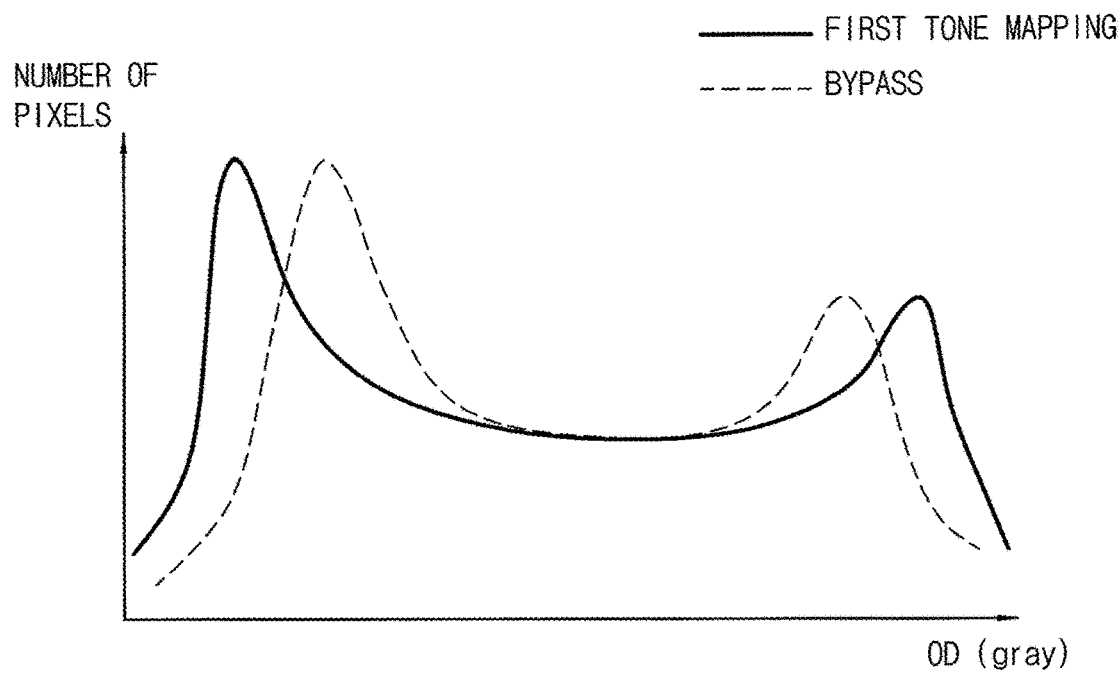
FIG. 5A is a graph for describing output data by a first tone mapping operation in an image processing method of FIG. 2.
Figure 5B:
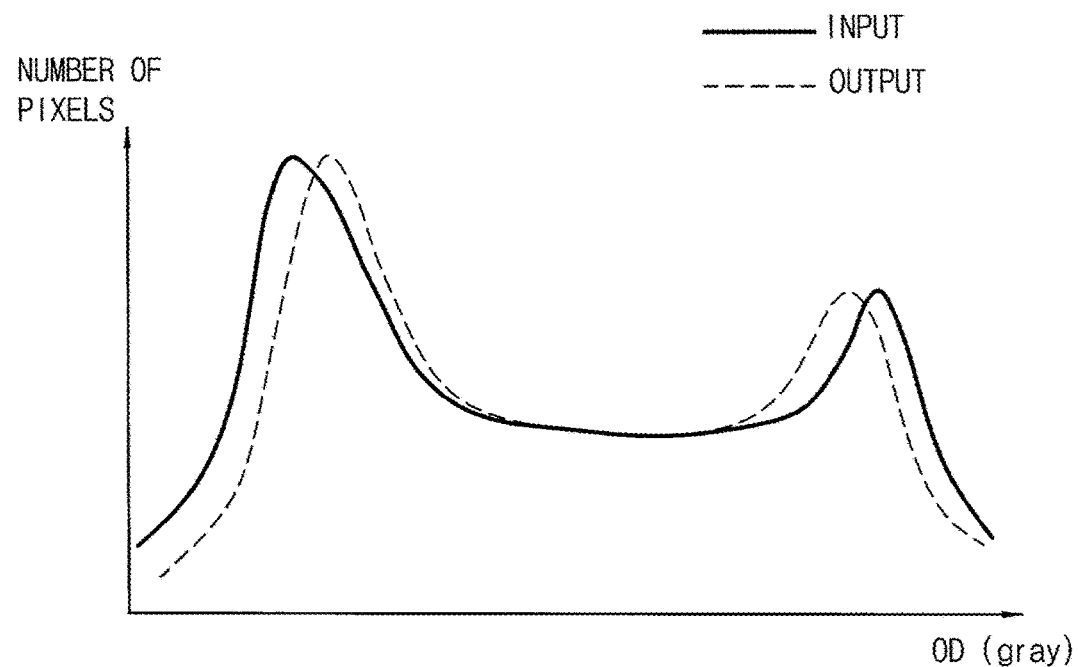
FIG. 5B is a graph for describing output data by a second tone mapping operation in an image processing method of FIG. 2.
Figure 6A:
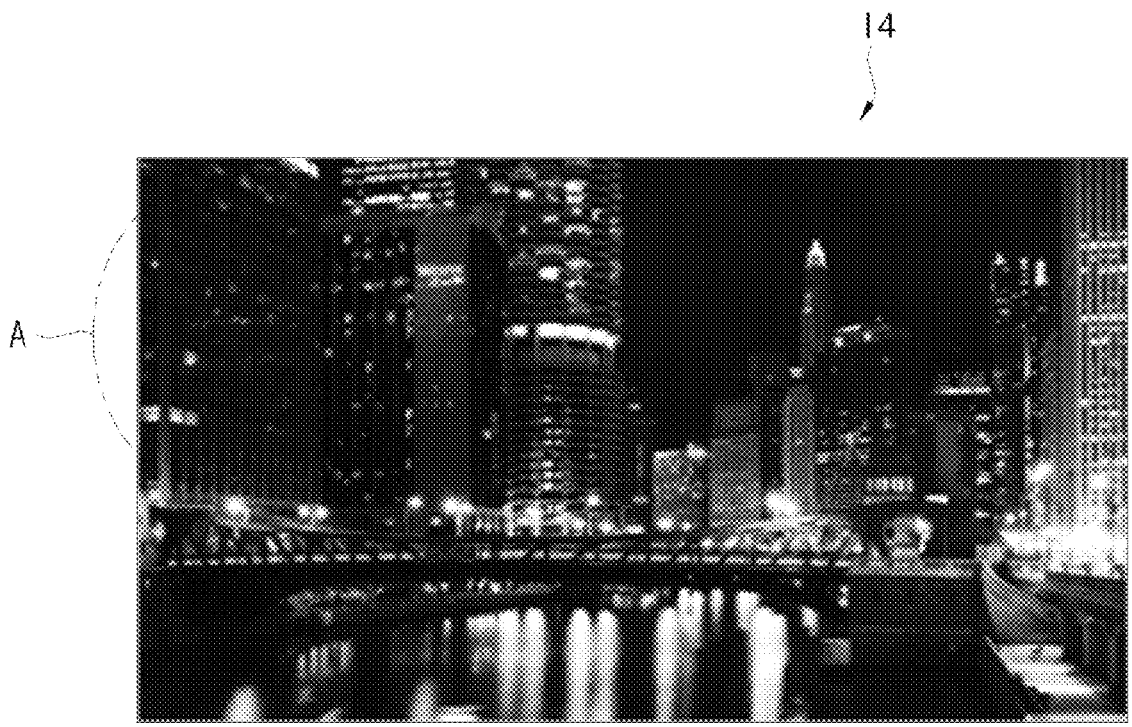
FIG. 6A is a diagram illustrating an example of an image generated by a first tone mapping operation in an image processing method of FIG. 2.
Figure 6B:
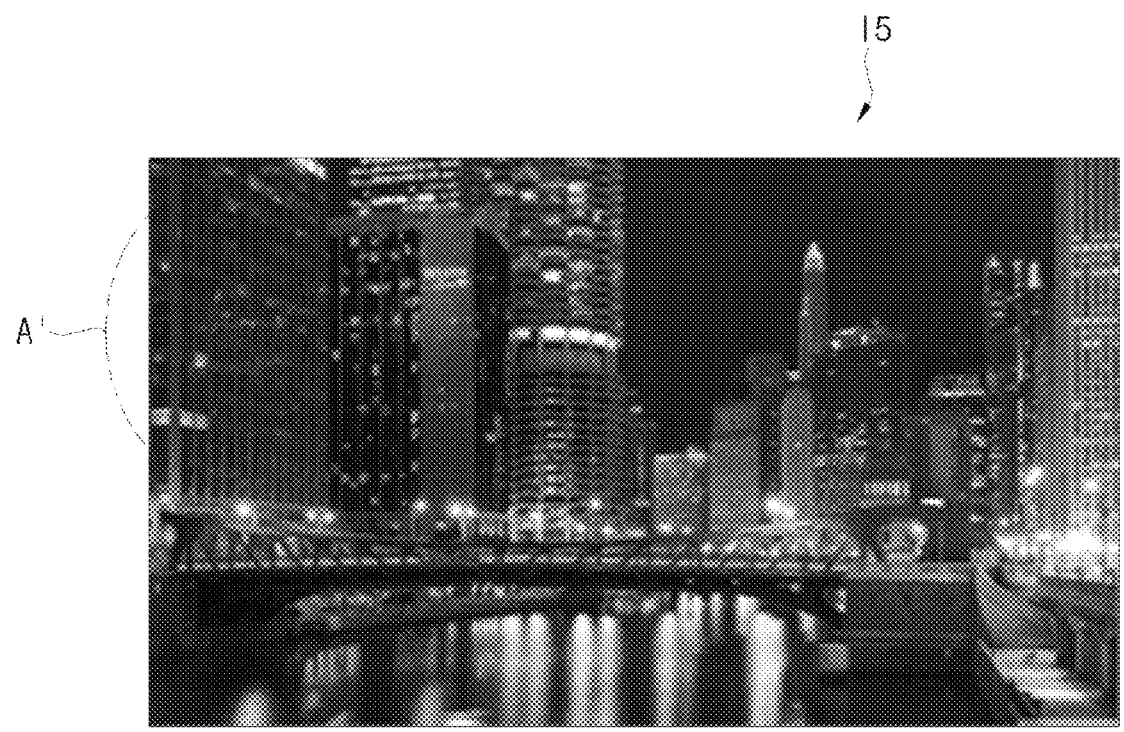
FIG. 6B is a diagram illustrating an example of an image generated by a second tone mapping operation in an image processing method of FIG. 2.

FIG. 4A is a graph for describing a first tone mapping operation in an image processing method of FIG. 2, FIG. 4B is a graph for describing a second tone mapping operation in an image processing method of FIG. 2, FIG. 5A is a graph for describing output data by a first tone mapping operation in an image processing method of FIG. 2, FIG. 5B is a graph for describing output data by a second tone mapping operation in an image processing method of FIG. 2, FIG. 6A is a diagram illustrating an example of an image generated by a first tone mapping operation in an image processing method of FIG. 2, and FIG. 6B is a diagram illustrating an example of an image generated by a second tone mapping operation in an image processing method of FIG. 2.

Referring to FIGS. 4A, 4B, 5A, 5B, 6A and 6B, an image processing method may select an appropriate tone mapping operation according to characteristics or conditions (e.g., a gray range, a color, etc. of an edge) of image data.

As illustrated in FIG. 4A, a first tone mapping operation may convert image data (or input data) ID into output data OD using a first conversion function. In some exemplary embodiments, the image data ID and the output data OD may have the same number of bits. In an exemplary embodiment, each of the image data ID and the output data OD may have 8 bits to represent 256 gray levels, for example. In other exemplary embodiments, the image data ID and the output data OD may have different numbers of bits. In an exemplary embodiment, the image data ID have 8 bits to represent 256 gray levels, and the output data OD may have 12 bits to represent 4,096 gray levels, for example.

As illustrated in FIG. 5A, compared with a bypass operation, the first tone mapping operation may convert the image data ID into the output data OD such that gray levels of the image data ID in a low gray region may become further lower and gray levels of the image data ID in a high gray region may become further higher.

As illustrated in FIG. 4B, a second tone mapping operation may convert the image data ID into the output data OD using a second conversion function. The second tone mapping operation may be an intermediate operation between the first tone mapping operation and the bypass operation.

As illustrated in FIG. 5B, compared with the first tone mapping operation, an amount of change from the image data ID to the output data OD may be relatively small. In some exemplary embodiments, in a first gray range (e.g., a low gray range), the output data OD generated by the first tone mapping operation may be less than or equal to the output data OD generated by the second tone mapping operation. Further, in a second gray range (e.g., in a high gray range), the output data generated by the first tone mapping operation may be greater than or equal to the output data generated by the second tone mapping operation.

In some exemplary embodiments, in a case where the image data ID and the output data OD have the same number of bits, a first absolute difference between the image data ID and the output data OD generated by the first tone mapping operation may be greater than or equal to a second absolute difference between the image data ID and the output data OD generated by the second tone mapping operation. Further, a third absolute difference between the output data OD generated by the first tone mapping operation and the output data OD generated by the bypass operation may be greater than or equal to a fourth absolute difference between the output data OD generated by the second tone mapping operation and the output data OD generated by the bypass operation.

Accordingly, as illustrated in FIGS. 6A and 6B, the first tone mapping operation may enhance the contrast compared with the second tone mapping operation. Thus, a fourth image I4 generated by the first tone mapping operation have a relatively high contrast compared with a fifth image I5 generated by the second tone mapping operation. However, the fifth image I5 generated by the second tone mapping operation may provide high detail of a low gray edge and a high gray edge compared with the fourth image I4 generated by the first tone mapping operation. In an exemplary embodiment, although windows of a building in a region A of the fourth image I4 are not clearly identified, the windows of the building in the region A' of the fifth image I5 may be clearly identified, for example.

Figure 7:
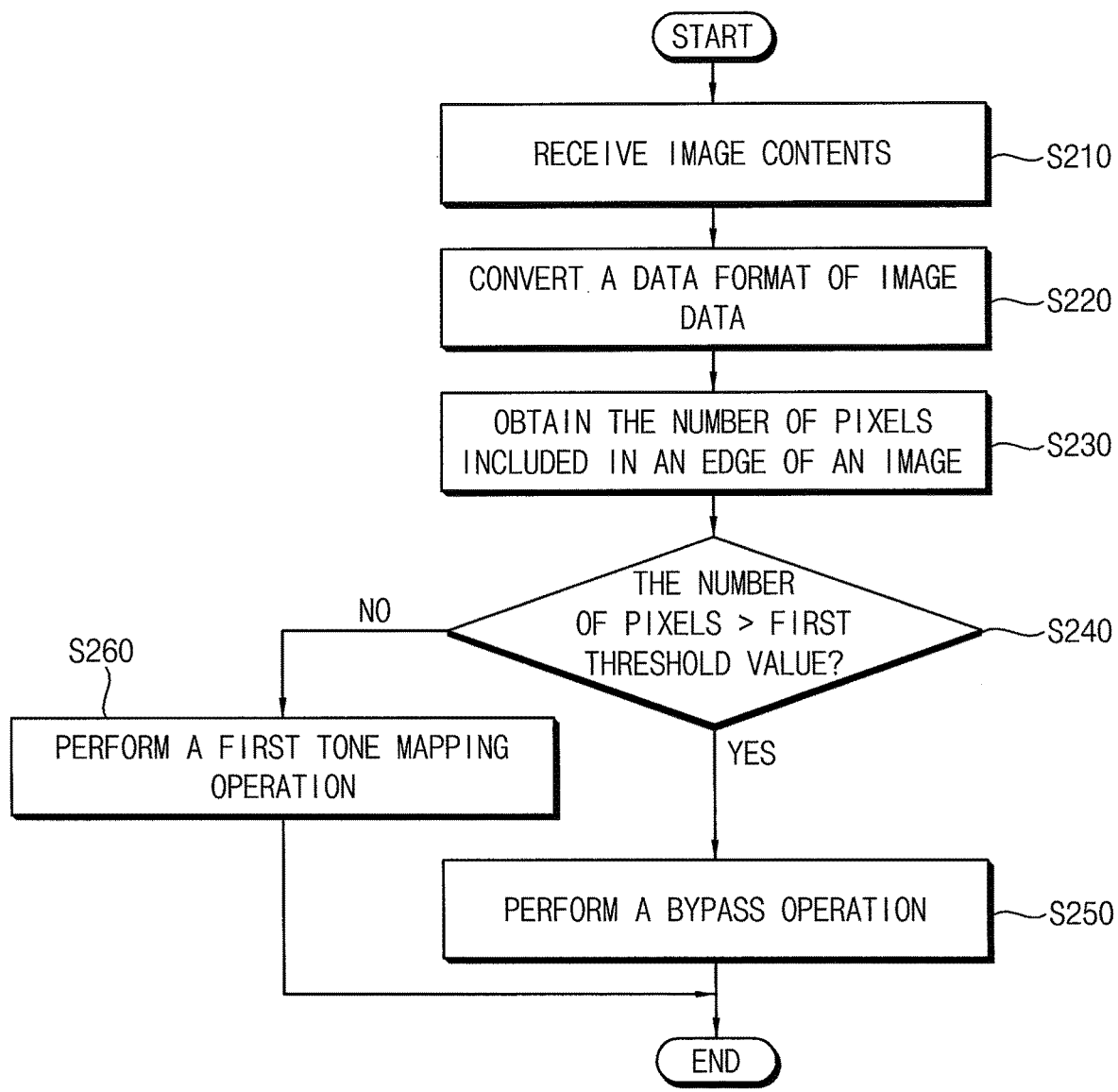
FIG. 7 is a flowchart illustrating an exemplary embodiment of an image processing method.
Figure 8A:
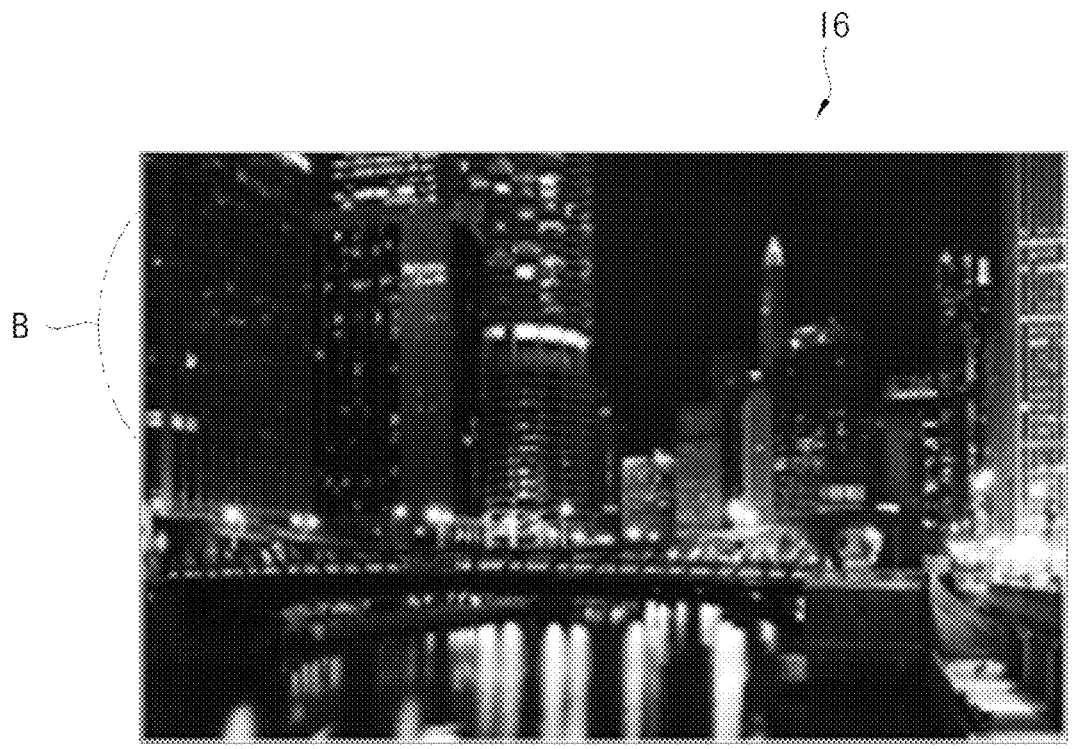
FIG. 8A is a diagram illustrating an example of an image generated by a first tone mapping operation in an image processing method of FIG. 7.
Figure 8B:
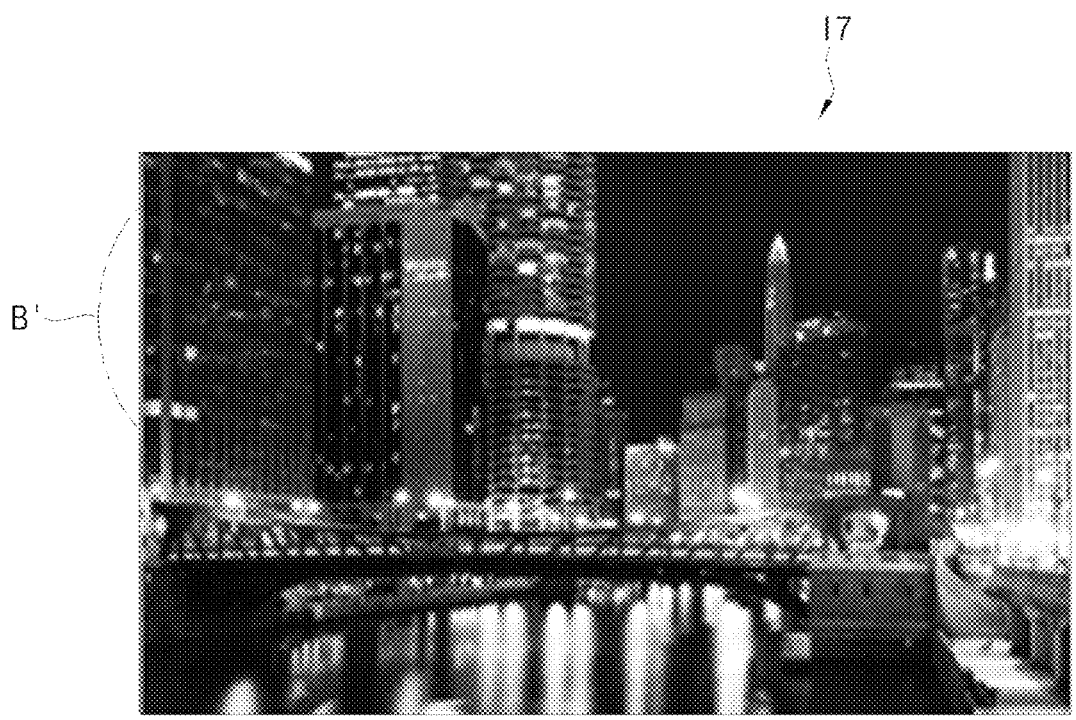
FIG. 8B is a diagram illustrating an example of an image generated by a second tone mapping operation in an image processing method of FIG. 7.

FIG. 7 is a flowchart illustrating an image processing method according to exemplary embodiments, FIG. 8A is a diagram illustrating an example of an image generated by a first tone mapping operation in an image processing method of FIG. 7, and FIG. 8B is a diagram illustrating an example of an image generated by a second tone mapping operation in an image processing method of FIG. 7.

Referring to FIGS. 7, 8A and 8B, an image processing method may detect an edge of an image, and, when the number of pixels of the detected edge is greater than a first threshold value, may apply linear tone mapping (i.e., perform a bypass operation) to the entire image data in a corresponding frame. Accordingly, an image including relatively many edges may have high detail of the edges.

In the image processing method, image contents including image data and meta data for the image data may be received (S210). To detect an edge of an image represented by the image data, a data format of the image data may be converted from an RGB format into a conversion image format where luminance data and chrominance data are separated (S220).

The number of pixels included in the edge may be obtained based on the image data (S230). In an exemplary embodiment, the edge of the image may be determined by applying a high-pass filter to the luminance data, and the number of pixels included in the edge may be obtained by counting the number of pixel data corresponding to the edge among the pixel data included in the image data, for example.

It may be determined whether the number of pixels is greater than a first threshold value (S240). When the number of pixels is greater than the first threshold value (S240: YES), a bypass operation may be performed on the entire image data (S250). In an exemplary embodiment, when the image of one frame represented by the image data includes many edges, it may be desired to provide high detail of the edges, for example. Thus, in this case, tone mapping may not be applied, or the bypass operation that linearly maps the image data to output data may be performed. In an exemplary embodiment, the first threshold value may corresponding to about 18% of the number of all pixels, and, when the number of pixels included in the edge is about 20% of the number of all pixels, the image data may be linearly mapped to the output data, for example.

Alternatively, when number of pixels is less than or equal to the first threshold value (S240: NO), a first tone mapping operation may be performed on the entire image data (S260). In an exemplary embodiment, when the image represented by the image data does not include excessive edges, the first tone mapping operation may be performed to enhance contrast, for example. In an exemplary embodiment, the first threshold value may corresponding to about 18% of the number of all pixels, and, when the number of pixels included in the edge is about 10% of the number of all pixels, the first tone mapping operation may be performed on the image data, for example.

As illustrated in FIGS. 8A and 8B, a seventh image I7 generated by the bypass operation may provide the high detail of the edges compared with a sixth image I6 generated by the first tone mapping operation. In an exemplary embodiment, although windows of a building in a region B of the sixth image I6 are not clearly identified, the windows of the building in the region B' of the seventh image I7 may be clearly identified, for example.

Figure 10:
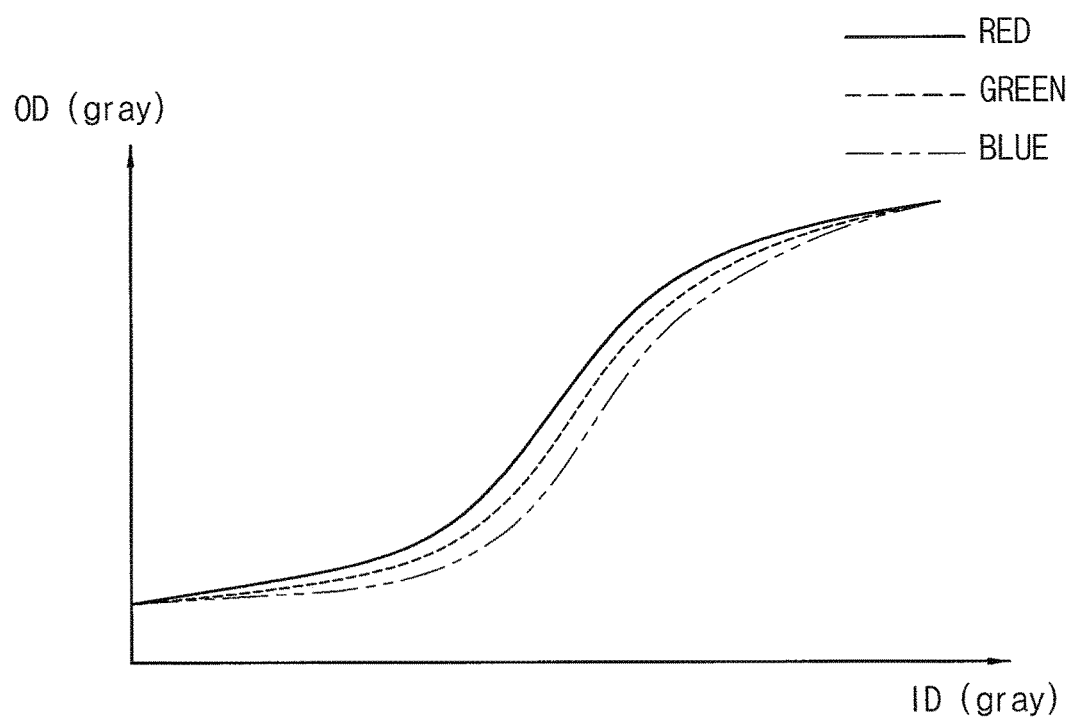
FIG. 10 is a graph for describing an operation that sets different weights according to colors of image data an image processing method of FIG. 9.

FIG. 9 is a flowchart illustrating an image processing method according to exemplary embodiments, and FIG. 10 is a graph for describing an operation that sets different weights according to colors of image data an image processing method of FIG. 9.

Referring to FIGS. 9 and 10, an image processing method may detect an edge of an image, and may apply relaxed tone mapping (or perform a second tone mapping operation) to a high gray edge and/or a low gray edge among the detected edge. The image processing method illustrated in FIG. 9 may be similar to an image processing method illustrated in FIG. 2, except that the image processing method illustrated in FIG. 9 may apply different weights to the relaxed tone mapping (or the second tone mapping operation) depending on colors. Thus, duplicated descriptions may be omitted.

In the image processing method, image contents including image data and meta data for the image data may be received (S310). To detect an edge of an image represented by the image data, a data format of the image data may be converted from an RGB format into a conversion image format where luminance data and chrominance data are separated (S320).

The edge of the image represented by the image data may be determined based on the luminance data (S330).

With respect to first image data representing a first portion of the image not including the edge of the image (S330: NO), a first tone mapping operation may be performed on the first image data included in the image data (S370).

With respect to second image data representing a second portion of the image including the edge of the image (S330: YES), it may be determined whether a gray level of the second image data included in the image data is within a predetermined gray range (S340).

If the gray level of the second image data is within the gray range (S340: YES), a color of the second image data may be determined (S350), and a second tone mapping operation may be performed by different weights according to the color of the second image data (S362, S364 and S366). In some exemplary embodiments, the second tone mapping operation may convert the image data corresponding to a first color into output data by a second conversion function to which a first weight is applied, and may convert the image data corresponding to a second color different from the first color into the output data by the second conversion function to which a second weight different from the first weight is applied. In an exemplary embodiment, when the second image data are red data (S350: RED), the second tone mapping operation may be performed by applying a first weight to a second conversion function (S362). When the second image data are green data (S350: GREEN), the second tone mapping operation may be performed by applying a second weight to the second conversion function (S364). When the second image data are blue data (S350: BLUE), the second tone mapping operation may be performed by applying a third weight to the second conversion function (S366).

In an exemplary embodiment, as illustrated in FIG. 10, since different colors may have different amounts of relationship with detailed representation of the edge, the tone mapping may be performed with the different weights for the respective red, green and blue data, for example. Accordingly, an accuracy of HDR image processing may be improved while providing detailed representation of the edge.

FIG. 11 is a flowchart illustrating an image processing method according to exemplary embodiments.

Referring to FIG. 11, an image processing method may detect an edge of an image, and may perform various tone mapping operations based on a gray range of the edge and the number of pixels included in the edge. However, since the image processing method may be similar to image processing methods of FIGS. 2 and 7, duplicated descriptions may be omitted.

In the image processing method, image contents including image data and meta data for the image data may be received (S410). To detect an edge of an image represented by the image data, a data format of the image data may be converted from an RGB format into a conversion image format where luminance data and chrominance data are separated (S420).

The number of pixels included in the edge may be obtained based on the image data (S430).

It may be determined whether the number of pixels is greater than a first threshold value (S440). When the number of pixels is greater than the first threshold value (S440: YES), a bypass operation may be performed on the entire image data (S450).

Alternatively, when number of pixels is less than or equal to the first threshold value (S440: NO), it may be determined whether at least a portion of the image data includes the edge of the image (S460).

With respect to first image data representing a first portion of the image not including the edge of the image (S460: NO), a first tone mapping operation may be performed on the first image data included in the image data (S490).

With respect to second image data representing a second portion of the image including the edge of the image (S460: YES), it may be determined whether a gray level of the second image data included in the image data is within a predetermined gray range (S470).

If the gray level of the second image data is within the gray range (S470: YES), a second tone mapping operation may be performed on the second image data (S480).

Alternatively, when the gray level of the second image data is not within the gray range (S470: NO), the first tone mapping operation may be performed on the second image data (S490).

Although some exemplary embodiments that select a tone mapping operation (or a tone mapping conversion function) based on an edge characteristic and conditions (e.g., a gray range of an edge, the number of pixels included in an edge, a color of an edge, etc.) are described above, the tone mapping operation may be selected based on various combinations of the edge characteristic of the image data and the conditions (e.g., a gray range of an edge, the number of pixels included in an edge, a color of an edge, etc.).

The inventions may be applied to any electronic device including an image processor. In an exemplary embodiment, the inventions may be applied to various devices such as a television ("TV"), a digital TV, a three-dimensional ("3D") TV, a smart phone, a mobile phone, a tablet computer, a personal computer ("PC"), a home appliance, a laptop computer, a personal digital assistant ("PDA"), a portable multimedia player ("PMP"), a digital camera, a music player, a portable game console, a navigation device, etc.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. An image processing method which converts image data into output data by performing tone mapping, the image processing method comprising:
    determining an edge of an image represented by the image data;
    performing a first tone mapping operation on first image data included in the image data, the first image data representing a first portion of the image not including the edge;
    determining whether a gray level of second image data included in the image data is within a predetermined gray range, the second image data representing a second portion of the image including the edge;
    performing a second tone mapping operation on the second image data when the gray level of the second image data is within the predetermined gray range; and
    performing the first tone mapping operation on the second image data when the gray level of the second image data is not within the predetermined gray range.

2. The image processing method of claim 1, wherein the first tone mapping operation converts the image data into the output data using a first conversion function, and
    wherein the second tone mapping operation converts the image data into the output data using a second conversion function different from the first conversion function.

3. The image processing method of claim 2, wherein the predetermined gray range includes at least one of a first gray range less than a first threshold gray level and a second gray range greater than a second threshold gray level, and
    wherein the second threshold gray level is greater than the first threshold gray level.

4. The image processing method of claim 3, wherein, in the first gray range, the output data generated by the first tone mapping operation are less than or equal to the output data generated by the second tone mapping operation.

5. The image processing method of claim 3, wherein, in the second gray range, the output data generated by the first tone mapping operation are greater than or equal to the output data generated by the second tone mapping operation.

6. The image processing method of claim 3, wherein at least one of the first gray range and the second gray range is adjusted based on an average gray level of the image data.

7. The image processing method of claim 2, wherein a first absolute difference between the image data and the output data generated by the first tone mapping operation is greater than or equal to a second absolute difference between the image data and the output data generated by the second tone mapping operation.

8. The image processing method of claim 1, wherein the determining the edge of the image includes:
    converting a data format of the image data from an RGB format to a conversion image format where luminance data and chrominance data are separated; and
    determining the edge by applying a high-pass filter to the luminance data.

9. The image processing method of claim 1, further comprising:
    obtaining a number of pixels included in the edge; and
    performing a bypass operation on an entirety of the image data when the number of pixels is greater than a first threshold value.

10. The image processing method of claim 9, wherein the output data generated by the bypass operation increase in linear proportion to an increase of a gray level of the image data.

11. The image processing method of claim 1, wherein the second tone mapping operation converts the image data corresponding to a first color into the output data by a second conversion function to which a first weight is applied, and converts the image data corresponding to a second color different from the first color into the output data by the second conversion function to which a second weight different from the first weight is applied.

12. An image processor which converts image data into output data by performing tone mapping, the image processor comprising:
    a signal receiver which receives image contents including the image data and meta data for the image data;
    a tone mapper which determines an edge of an image represented by the image data, performs a first tone mapping operation on first image data included in the image data, where the first image data represent a first portion of the image not including the edge, determines whether a gray level of second image data included in the image data is within a predetermined gray range, where the second image data represent a second portion of the image including the edge, performs a second tone mapping operation on the second image data when the gray level of the second image data is within the predetermined gray range, and performs the first tone mapping operation on the second image data when the gray level of the second image data is not within the predetermined gray range; and
    an image controller which performs a post-processing operation on the image based on the output data and the meta data.

13. The image processor of claim 12, wherein the first tone mapping operation converts the image data into the output data using a first conversion function, and
    wherein the second tone mapping operation converts the image data into the output data using a second conversion function different from the first conversion function.

14. The image processor of claim 13, wherein the predetermined gray range includes at least one of a first gray range less than a first threshold gray level and a second gray range greater than a second threshold gray level, and
    wherein the second threshold gray level is greater than the first threshold gray level.

15. The image processor of claim 14, wherein, in the first gray range, the output data generated by the first tone mapping operation are less than or equal to the output data generated by the second tone mapping operation.

16. The image processor of claim 14, wherein, in the second gray range, the output data generated by the first tone mapping operation are greater than or equal to the output data generated by the second tone mapping operation.

17. The image processor of claim 12, wherein the tone mapper obtains a number of pixels included in the edge, and performs a bypass operation on an entirety of the image data when the number of pixels is greater than a first threshold value.

18. The image processor of claim 12, wherein the second tone mapping operation converts the image data corresponding to a first color into the output data by a second conversion function to which a first weight is applied, and converts the image data corresponding to a second color different from the first color into the output data by the second conversion function to which a second weight different from the first weight is applied.

* * * * *